ns* at spaced apart nodes.

United States Patent [19]
Lepoutre et al.

[11] 3,985,599
[45] Oct. 12, 1976

[54] SLIT FILM

[76] Inventors: Pierre Lepoutre, 552 St. John, Pointe Claire, Quebec, Canada; Heinz Alfred Pieniak, 15030 El Vista Ave., Oak Forest, Ill. 60452

[22] Filed: Mar. 5, 1974

[21] Appl. No.: 448,249

Related U.S. Application Data

[63] Continuation of Ser. No. 186,838, Oct. 6, 1971, Continuation-in-part of Ser. No. 93,646, Nov. 30, 1970, abandoned.

[52] U.S. Cl. ............................. 156/164; 156/229; 156/259; 156/271; 264/146; 264/288; 428/134; 428/137; 428/910
[51] Int. Cl.² ...................................... B32B 31/08
[58] Field of Search ........... 156/160, 163, 164, 229, 156/252, 259, 269, 271, 306; 161/402, DIG. 6; 264/146, 156, 288, 289, 291, DIG. 47, DIG. 81; 428/910, 134, 136, 137

[56] References Cited
UNITED STATES PATENTS

| 2,429,177 | 10/1947 | Young | 161/402 |
|---|---|---|---|
| 3,300,366 | 1/1967 | Krolik, Jr. | 161/112 |
| 3,387,077 | 6/1968 | Sammons et al. | 264/289 |
| 3,454,455 | 7/1969 | Rasmussen | 161/112 |
| 3,719,540 | 3/1973 | Hall | 156/267 |

FOREIGN PATENTS OR APPLICATIONS

| 495,121 | 8/1953 | Canada | 156/164 |
| 1,300,599 | 8/1969 | Germany | 161/402 |

*Primary Examiner*—Douglas J. Drummond
*Assistant Examiner*—Brian J. Leitten
*Attorney, Agent, or Firm*—Diller, Brown, Ramik & Wight

[57] ABSTRACT

A slit film and method of making same, the slits forming apertures defined by a plurality of axially oriented spaced apart ribbons, the film is pre-slit to define a plurality of substantially parallel interconnected ribbons and stretched axially of said ribbons to orient the ribbons and neck same down to define the open areas therebetween. Preferably, the ribbons will be interconnected at spaced apart nodes.

2 Claims, 9 Drawing Figures

INVENTORS
Pierre LEPOUTRE
Heinz Alfred PIENIAK

ATTORNEY

INVENTORS
Pierre LEPOUTRE
Heinz Alfred PIENIAK

ATTORNEY

SLIT FILM

This Application is a continuation of our Application Ser. No. 186,838, filed Oct. 6, 1971, which in turn is a continuation-in-part of our Application Ser. No. 93,646, filed Nov. 30, 1970, now abandoned.

BACKGROUND OF THE INVENTION a. Field of the Invention

The present invention relates to reinforced laminates and to films for making such laminates. More particularly, the present invention relates to reinforced paper, textiles or the like incorporating at least one layer of an oriented slitted or apertured film.

b. Description of Prior Art.

Reinforced laminates using textiles, scrim or filaments of cotton, rayon, nylon, fiberglass, etc. placed between two layers of paper or the like are known and are widely used. It has also been proposed by applicant to replace the filaments, scrims or threads by narrow, highly oriented polymeric tapes. It has further been proposed to use fibrillated film such as fibrillated highly oriented polymeric film which is particularly suitable for materials having a high level of flexibility or drape, as in non-wovens.

Where the material is to be reinforced in two directions (i.e. in the machine direction and cross-machine direction) the disposition of cross-machine direction reinforcing threads, filaments or tapes, is generally performed by means of elaborate machinery involving alternating motion of a revolving turret onto which bobbins for the reinforcing materials are mounted. Such equipment is generally troublesome and requires heavy maintenance rendering continuous operation difficult.

When fibrillated film is used, it is generally preferred to spread the film to thereby reduce the total reinforcing material necessary. However, spreading of a fibrillated film is a difficult operation and causes twisting of the individual interconnected filaments or the like forming the fibrillated film and thereby limits the degree the fibrillated film may be open to depend on the width of the individual filaments so that a large open area film is limited to those films having relatively narrow individual filaments. Also the fibrillation pattern of the film sets limits on the degree to which it can be spread.

Fibrillated films from polyolefins have been used to make yarns, cordages and in other textile applications to replace natural fibers or conventionally spun yarns. The practice of fibrillation resulted from the observation that highly oriented film was easily fibrillatable and the method involves first orienting an orientable synthetic organic polymer film by stretching, preferably while heated, followed by fibrillation by one of numerous ways known in the trade. One way of post-orientation fibrillation is by running the film over a roll surfaced with a plurality of perforating pins. An endeavour of this procedure is to make fine denier fibers of high strength, relying on the orientation step to provide the strength and having the advantage of replacing the more complex spinning process.

Fibrillation of oriented polymeric films is well known in the art. Linear polymers, after being highly oriented monoaxially possess considerable strength in the orientation direction, but little strength in the transverse direction so that they can be fibrillated in various ways. Some polymers, with low intermolecular forces, for example linear polyolefins can be fibrillated with ease. Others, due to their chemical composition or structure possess relatively strong intermolecular forces between adjacent polymer chains, making the fibrillation, by known means, difficult. Nylon is an example of such a polymer. Others are non-linear, or branched polymers, such as LDPE.

Another case where the present fibrillation methods fail is when film laminates, containing at least one layer of a difficult to fibrillate polymer are processed. For example, a low density polyethylene-polypropylene laminate offers resistance to the penetration of the fibrillating means, for example pins or hacksaw blades.

Still another instance where the present fibrillation methods fail is when a high degree of residual elongation is required in the fibrillated material. This is because a high degree of orientation is needed to obtain fibrillating properties and elongation to break decreases sharply with degree of orientation.

A further example of failure of the present fibrillation methods is when a very high degree of regularity is desired in the fibrillated film pattern, that is when the individual filament denier must be carefully controlled.

A major shortcoming of present fibrillation methods, is that the fibrillated film suffers a considerable drop in tensile elongation and thereby toughness or energy to rupture properties, as compared with the unfibrillated film. For example, a 1 inch wide strip about 1 ml. thick oriented polypropylene film will break under a load of 50 lbs. after an elongation of 10 to 15%. If the same film is fibrillated, then the resultant fibrillated film will break under a load of 10 to 30 lbs., after an elongation of 6 to 8% depending on the fibrillating means and the extent of fibrillation.

SUMMARY OF INVENTION

It is an object of the present invention to provide a new reinforcing element having a plurality of interconnected filaments oriented in situ in the film.

It is a further object of the present invention to provide a laminate incorporating the film.

It is a further object of the present invention to provide a method of making an apertured oriented film.

It is a further object of the present invention to provide a method of controlling the aperture size in the formation of an aperture oriented film.

It is a further object of the present invention to provide a method of making an oriented slit film having substantially zero apertures.

It is a further object of the present invention to provide a method of making a laminate.

It is a further object of the present invention to provide an apertured film having substantially no nodes therein.

According to yet another feature, the invention relates to a film having a plurality of ribbons integrally interconnected at nodes spaced throughout said film, said ribbons being oriented in their longitudinal direction and being spaced from each other except at said nodes to define openings in said film, said ribbons when the film is laid flat being substantially in a common plane.

The present invention also broadly relates to a method of forming an apertured film comprising, forming slits in a film in a predetermined pattern to define side edges of ribbons of said apertured film, stretching said film substantially axially of said slits, thereby necking down said ribbons to form openings therebetween.

The present invention has as another of its features to overcome the disadvantages of post fibrillation mentioned previously and provide, among other advantages, means of producing fibrillated films from polymers which are not readily fibrillatable by the post fibrillation method.

A further aim is to provide in films, which although they do easily fibrillate by the post fibrillation process, an increase in a specific tensile strength as compared to that resulting from the latter process.

It has been found that a product closely similating a conventionally made fibrillated film, but with considerably improved tensile, elongation and energy to break properties, a high degree of uniformity and having good resistance to undesired further self-fibrillation, can be produced from polymer films which are orientable, but not necessarily fibrillatable. This is done by performing a special slitting operation prior to the orientation step.

A series of small slits, parallel to the direction in which the film will be stretched, placed in an arrangement so that they define narrow, discontinuous tapes of various lengths and widths is made into a film, and the film is then stretched longitudinally. For some polymers, the film may be stretched up to 15 times its length. The stretched film will resemble a film fibrillated by conventional means, but will have the advantages described herein.

More specifically, the starting material is an unoriented film of a thermoplastic synthetic organic polymer. This film is slit in a pattern of discontinuous parallel elongated slits which are spaced apart laterally with the slits in adjacent rows staggered longitudinally to provide a plurality of integrally connected tapes. The thus slit film is then stretched in the general direction of the slits thereby to orient the molecules of the polymer and impart to the tapes increased tensile strength and other properties. Stretching may be facilitated by performing it at an elevated temperature to soften the polymer.

During the stretching process, the film necks in width and thickness while it elongates and becomes oriented and strong. The slits made in the unoriented film increase in length by a factor corresponding to the draw ratio while the distance between two parallel and adjacent slits decreases by a factor approximating to the square root of the draw ratio used if this distance is small compared to the slit's length.

Thus, if the distance between two adjacent parallel slits is 3 mm, the width of the small tape comprised between them becomes roughly 1 mm after stretching the film to a draw ratio of 9:1 while the length of slit has been increased by a factor of 9.

Any desired fibrillation pattern can be reproduced at ease, simply by performing slits in the same pattern on the unoriented film and dividing the final slit length desired by the draw ratio used and multiplying the distance between two adjacent slits by the square root of the draw ratio.

The decrease in width of the respective tapes between any two adjacent slits is of great help since it permits the obtaining, after stretching, of a filament width much smaller than the distance between the slitting blades. This enables fibrillated films combining high tenacity and very fine denier per filament to be obtained.

The invention also contemplates lateral stretching of a pre-slit film, for example in a tenter device. This produces pre-slit oriented films with filaments and strength in a direction perpendicular to the film length. In this case, slits are made, prior to orientation, along the width of the film.

One problem which arises when the above pre-slit film is fed into the tenter device, and stretched, is that each tape comprised between two adjacent, staggered slits, necks individually in thickness and in width, thus creating apertures between them.

This problem of the formation of apertures is caused by the restriction of constant film length as the clamps diverge. To overcome it, it is necessary to lift up this restriction of constant length by folding or corrugating the pre-slit film, widthwise, prior to feeding it into the lateral stretcher. This can be done by passing the film between two rolls having ribs parallel to the roll axis, followed by the flattening of the flutes prior to feeding the film into the clamps of the tenting device.

The extent of folding applied will control the degree the apertures will form for any given draw ratio used. If apertures of essentially zero width are desired, the corrugating or folding should be such that the mass-feeding rate of the film be at least equal to or larger than the take-up rate times the square root of the draw ratio used.

Similarly, the distance over which the film is stretched, when longitudinal stretching is used, can be shortened if the film stretched while pleated, with the pleats running along the direction of stretching; this is particularly applicable to systems using short draw distances. For longer draw distances, where the film as a whole has a chance to neck down the pleating is less necessary to decrease the effect of aperture formation. The pleating serves the purpose of forcing the whole film rather than the individual tapes comprised between the slits to neck in width. The pleating operation can be performed simply by running the film between two corrugated rolls.

For systems using short draws, the apparatus is often constructed so that the draw-length can be varied; in this situation, the degree of necking can be controlled by varying the draw length.

Among film forming materials, which may be employed in the invention are thermoplastic synthetic organic polymers, for example, polyolefins and polyamides for instance polyethylene, polypropylene and copolymers of polyolefins, halogenated polymers (e.g. polyvinylchloride; fluorocarbons; polytetrafluoroethylene, etc.) polyesters, polystyrene as well as physical blends, nylons and polyvinyl resins, for instance polyvinyl alcohol, polyvinylchloride, polyvinylacetate, polyvinylidene chloride, thermoplastic urethanes and various copolymers of the monomers of the above polymer.

The polymer may contain the usual modifying agents, for example stabilizers, plasticizers, dyes, anti-slip agents, air or other gas in the case of foamed films, and so on, without interfering with its performance in the method of the invention.

The polymer may be formed in a film by extrusion, casting, blowing or other film-forming method. The thickness of film can be any formable thickness. Under existing methods the film thickness usually runs within the range from about three-tenths of a mil to about twenty mils. The applicant prefers to start with substantially unoriented film, although there may be a certain amount of orientation resulting in the film formation. If desired, the film can be initially stretched below the yield point at or prior to slitting and consequently oriented.

The slitting may be performed by known means according to the desired pattern. Preferred method and apparatus are disclosed in U.S.A. Pat. Application Ser. No. 161,045, filed July 9, 1971.

A typical film would have a width of say two feet and the drawing operation would be done over a span of from ten to twenty feet in an oven heated to a temperature effective to soften the film so as to facilitate the drawing operation. What typically takes place is that the film, at the beginning of the path through the oven is cold and is pregressively heated and softened as it passes through the oven. Necking takes place at a neck-line which is at a certain distance from the entrance to the oven. The location of the necking zone depends on a number of factors including the rate of stretching, the temperature of the oven, and the nature and thickness of the film material.

The drawing ratio will generally be in the range of from about 2:1 to about 16:1 and a typical drawing ratio for some polymers would be from about 6:1 to about 10:1. Lateral drawing should be over a distance, for example twenty feet for a two foot width film. The distance over which longitudinal drawing takes place will vary with the technique used; with the short-draw the stretching takes place over a distance of a few inches, other techniques involve must greater distances. A typical width of the tapes is 0.6 to 0.7 mm after orientation although the tapes can be made wider or narrower for certain purposes.

The slits formed in the film may be in a staggered or unstaggered configuration and in a variety of patterns, and they may be inclined at an angle of up to about 45° to the direction of stretching. Also slits may be superimposed on one another to form, say, crosses and in this case the film could be stretched in the directions of the superimposed slits to form a bi-axially oriented film.

In the case where the slits are made in one direction but are unstaggered, that is to say the slits form rows, film may be stretched in a direction at right angles to the direction of the slits preferably after being stretched in the direction of the slits; in this case the stretching force applied at right angles to the direction of the slits would be accommodated by the film material in the unslit columns between the rows of slits.

In the case where slits are in the form of crosses, and the crosses form unstaggered rows, the film may be stretched in a first direction parallel to one set of arms of the crosses, and then in a second direction parallel to the second set of arms, thus producing a bi-axially oriented film.

The invention also relates to laminates, which may be made from one or more reinforcing films according to this invention, that is to say, apertured films, slit films having substantially zero apertures and slitted films comprising tapes in which there are substantially zero nodes between the tapes and to combinations of these films with each other and with other substrates.

The invention also relates to a method of making laminates which method is applicable to the laminates in which the reinforcements are the films according to this invention and to conventionally made post fibrillated films or other net-like films or combinations of such films.

In one aspect, the method of making a laminate comprises continuously feeding at least first and second films into a laminator for example into the nip of two laminating rolls, wherein the first film has a property of high intensity in the longitudinal direction (i.e. the machine-direction) of said film and the second film has the same or another property of high intensity in a direction not greater than 45° to the lateral direction (i.e. the cross machine-direction) of said film. The product resulting from such a method will be a laminate having properties whose intensities will vary or extend in more than one direction. In the above, the product, resulting from the laminating of two films which have been oriented at right angles to each other, will have a very high tensile strength in both the machine and cross directions. In the case of slit films, the resulting product will have slits (and the properties that go with these slits) extending in both the cross and machine direction; and, in the case of films of tapes, the tapes (and their properties) will extend in more than one direction. Two films each having the property of being able to polarize light in one direction, when laminated by the method of this invention so that the polarizing effect of each film is at right angles to the other, will produce an opaque film. Films or layers of materials, each having greater stiffness in directions at right angles to the other can be laminated to produce a more uniformally rigid product — similarly other properties can be combined in this way.

In the method of making a laminate the steps of producing the properties of high intensity may be carried out in an in-line manner, or they may be carried out separately and the resulting films brought together to laminate them. For example, in the case where a laminate is to be formed of two films slit and oriented in different directions, the steps of slitting, oriented in different directions, the steps of slitting, orienting and laminating the films may take place as a continuous process, or the steps may be quite separate.

In one aspect, the product of the above method comprises a laminate having properties whose intensities vary and extend in more than one direction, comprising at least first and second films bonded together wherein the first film has a property of high intensity in the longitudinal direction of said first film and the second film has the same or another property of high intensity in a direction not greater than 45° to the lateral direction of said second film, said first and second films being disposed such that the longitudinal direction of the first film is parallel to the longitudinal direction of the second film.

In a simple embodiment of the above referred to method two films are slit simultaneously, one of said films being slit in the longitudinal axis of the film and the other of said films having been slit in the lateral axis of said film, said two films are then fed while still under tension into a laminator. There is thus formed, a reinforcement or a reinforced lamination equally strengthened in two directions at right angles to each other.

It will be apparent that the method can be readily adapted both to the films according to the invention and to conventionally made post fibrillated films. In the latter case the films are stretched and remain under tension while they are fibrillated, the fibrillated film is spread in order to form a reinforcing network and can then be fed into a laminator while it is maintained under tension. Similarly the invention can be adapted to film which is embossed prior to stretching. However, the net-like films made by the present invention, namely by slitting prior to stretching, particularly by that method described in the above mentioned copending application, are generally superior in strength to those made by other methods, e.g. fibrillation, embossing, etc.

The method is applicable to laminates of like films or of combinations of unlike films and can be used when both films are slit in the same direction.

BRIEF DESCRIPTION OF DRAWINGS

Further features, objects and advantages of the present invention will be evident from the following detailed description taken in conjunction with the accompanying drawings in which.

DESCRIPTION OF PREFERRED EMBODIMENTS

The method of forming the open film of the present invention will first be described.

Figure 1:
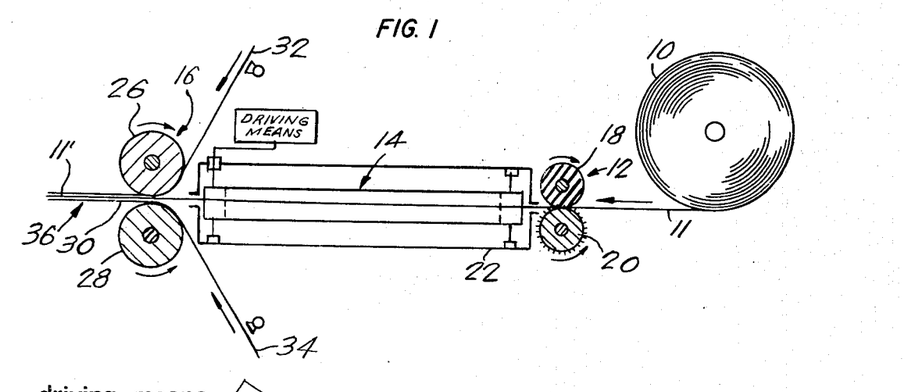
FIG. 1 is a side elevation view schematically illustrating the present invention.
Figure 2:
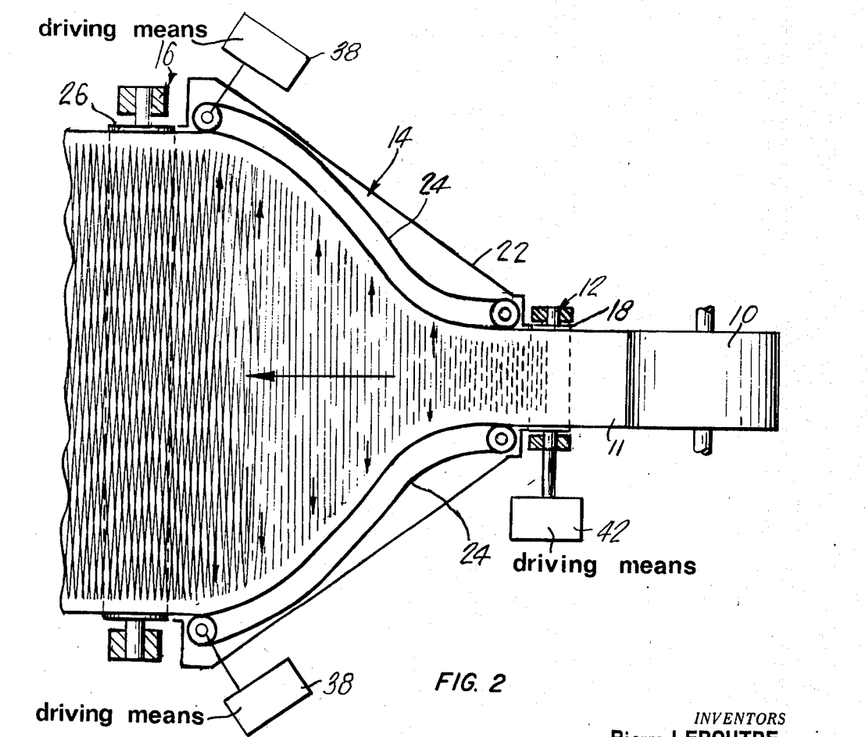
FIG. 2 is a schematic plan view further illustrating the method of the present invention.

Referring to FIGS. 1 and 2, it can be seen that the apparatus for forming the open film schematically includes a roll of film 10, a slitting apparatus 12, a tentering apparatus 14 and a laminating apparatus 16.

In the illustrated arrangement, the slitting apparatus comprises a backing roll 18 and a slitting roll 20, the latter being provided with a plurality of knives 22 arranged in the desired pattern to make the required slit pattern in the film. The knives are elongated elements having their axis parallel to the axis of rotation of the rolls 18 and 20 and thus perpendicular to the longitudinal axis of the film.

The slitting apparatus 12 has been shown immediately preceding the tentering apparatus 14. It is apparent that the film 11 may be pre-slit and wound on the roll 10 or the position of the slitter 12 may be changed to a position within the tenter so that the material is under tension when it is slit. In the latter case, care would have to be taken to ensure that the slitter is able to cut the film to immediately adjacent the gripping mechanism.

The tentering mechanism 14 schematically includes a pair of diverging gripping belts or the like 24. These belts engage the lateral edges of the film and by moving in a diverging path stretch the film laterally thereby orienting same.

The laminator 16 in the illustrated arrangement simply comprises a pair of driven rolls 26 and 28 forming a nip 30 which forces the webs 32, 34 formed of paper, fabrics, plastic films, non-woven materials or the like, and the apertured film 11' together to form the laminate 36. Any suitable means for applying adhesive to the webs 32, 34 or 11' may be provided to ensure that the laminate 36 so formed is securely held together.

The various apparatus of the present invention may be driven by any suitable means such as the drive means illustrated at 38 for the tentering device 14 and the drive means 42 for the slitting device 12.

Figure 4:
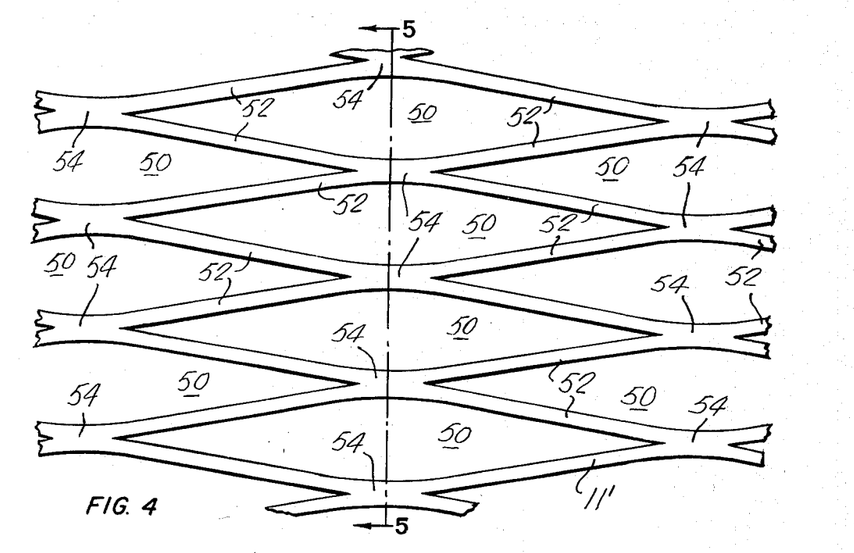
FIG. 4 is a plan view of the apertured film.

One specific pattern of slits formed by the slitting mechanism 12 is illustrated in FIG. 4. As can be seen, a substantially uniform staggered relationship of slits 44 through the film 11 is provided. In the arrangement, a set of slits aligned in a row such as the slits 44' which extend laterally of the web are spaced apart to form nodes 46 therebetween. Each row of slits 44 and nodes 46 is staggered relative to the slits 44 and nodes 46 of the next adjacent rows substantially as shown.

Figure 3:
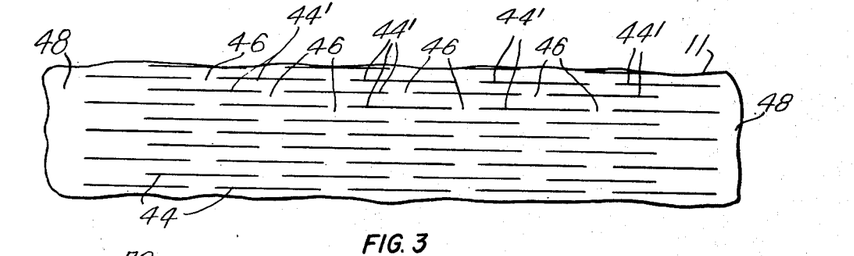
FIG. 3 is a plan view of the slit film.

The pattern of slits preferably, but not necessarily, terminates short of the lateral side edges of the sheet, thereby forming a border section 48 at each side of the film. These border sections 48 are gripped by the gripping belts 24 of the tenter device 14 and facilitate handling of the web and distribution of the stresses imparted to the web during the tentering operation.

The apertured film 11' is formed by a pattern of apertures or holes 50 defined by elongated oriented ribbons 52 interconnected at node points 54 formed by the nodes 46 between adjacent slits 44 in each row. The openings 50 are formed due to the elongation and necking down of the ribbons 52 defined by the slits 44 during the tentering operation. The ribbons 52 neck down in both the lateral dimension and in thickness, i.e. in width and thickness, thereby reducing the space they occupy and thereby forming the open areas 50 in the film 11' and increasing the tenacity of the apertured film 11'.

Figure 5:
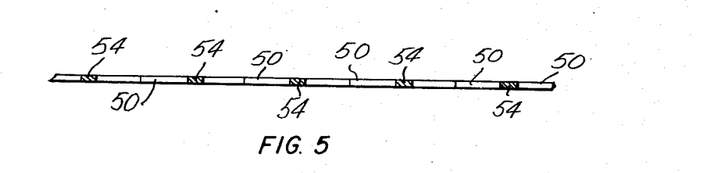
FIG. 5 is a section along the line 5—5 of FIG. 4.

It can be seen from FIG. 5 that the film is substantially flat with the ribbons 52 extending in substantially the same plane as the apertured film opens. This may be contrasted with an open fibrillated film which requires that the interconnected filaments twist to permit opening. The relatively flat apertured film of the present invention, as above indicated, facilitates laminating and permits relatively wide ribbons 52 to be used without unduly affecting the surface characteristics of the laminate.

The arrangement shown formed from a symmetrical pattern of slits provides a uniform apertured film having tapes or ribbons 52 of substantially identical length.

The laminate 36 which comprises a pair of layers of paper with an apertured film 11' therebetween is suitable for many uses. It will be noted that the reinforcing film 11' is easily incorporated therein and extends substantially flat and provides an adequate increase in both the tensile and tear strength to the resultant laminate.

Figure 6:
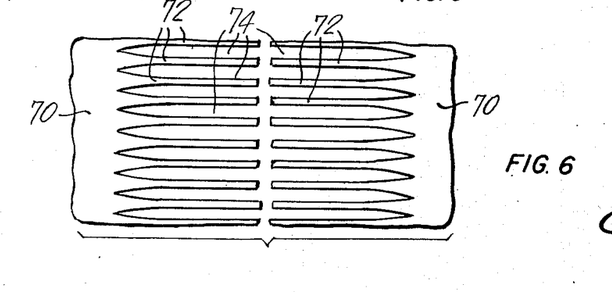
FIG. 6 is a plan view of another embodiment of an apertured film of the present invention.

Hereinabove, the disclosure has been directed to a film that has a pattern of slits therein adapted to form an apertured film having a plurality of nodes. It is also possible to eliminate the nodes and have the slits extend transversely substantially the full width of the slitting device. In the latter case, each slit would terminate spaced from the edge of the film leaving border sections as shown at 70 in FIG. 6. As shown in FIG. 6, the resultant product after stretching includes a plurality of laterally extending tapes 72 which are spaced by intervening openings or slots 74 that extend the full width of the apertured film between the border sections 70. Thus, the resulting film in this embodiment includes a plurality of laterally extending ribbons 72 interconnected at their opposite ends by border sections 70 and spaced laterally from each other by intervening slots 74. Slots 74 are formed by necking down of the ribbons 72 during the tentering operation.

During the stretching operation of the film of FIG. 6, each of the ribbons 72 is independent of its neighbor so that during the tentering operation it necks down in both thickness and width whereby after stretching, the elongated ribbon 72 has been reduced in width and are therefore spaced apart. The reduction in width and the spacing apart of the tapes is a function of the original width tapes and of the stretch or dry ratio used. For example, if the slits were 3 mm. apart and the draw ratio was 9:1 the tapes would be after stretching approximately 1 mm. wide and spaced apart by about approximately 2 mm.

By controlling the spacing or distance between adjacent slits and the draw ratio, the distance between and width of individual tapes in the apertured film after stretching can be adjusted.

The latterally stretched tapes may now be carried forward using the unslit edges or border portions 70 to support them into a laminator wherein longitudinally oriented spaced apart tapes may also be fed simultaneously with plies of paper thereby to form a laminate that may be glued or secured together in any suitable manner using any suitable form of adhesive between the lamina. If desired, the apertured film per se may be used as the sole reinforcing lamina.

A parallel array of tapes may be formed by slitting a film longitudinally substantially the full length of the film. The resultant product after stretching comprises a plurality of longitudinally extending tapes, which extend the full desired length of the film. In all cases, however, the tapes would be joined at one piece at least; for example, the beginning of the film would have an unslit border section (similar to the laterally slit tapes). The product would then have a unity and not merely be a series of individual tapes which could each be wound up on separate spools.

Figure 7:
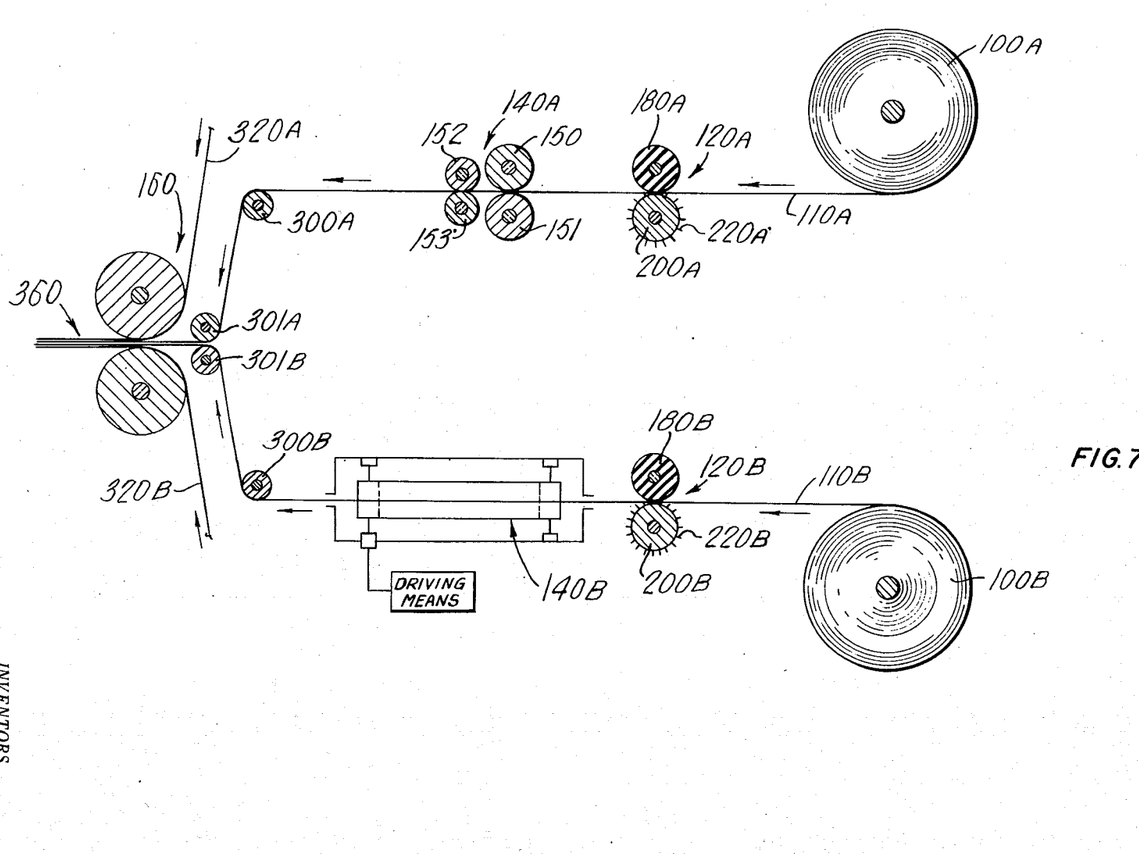
FIG. 7 is a side elevation schematically illustrating one method of making a laminate according to the invention.

With reference to FIG. 7 continuous lengths of film 110A and 110B are fed from supply rolls 100A and 100B, the films 110A, 110B pass between slitting apparatus 120A, 120B and between longitudinal stretching apparatus 140A and tentering apparatus 140B from which they pass between pairs of rollers 300A, 301A and 300B, 301B to a laminator 160.

The longitudinal stretching apparatus 140A which comprises rollers 150, 151 and 152, 153, the two pairs of rollers rotating at different speeds and more particularly rollers 152, 153 rotating at a higher speed than rollers 150, 151, stretches the film 110A in the longitudinal direction of the film 110A and the tentering apparatus 140B stretches the film 110B in the lateral direction of the film 110B.

In the illustrated arrangement, the slitting apparatus comprises backing rolls 180A, 180B and slitting rolls 200A, 200B provided with a plurality of knives 220A and 220B arranged in a pattern to make the required slit pattern in the film. The knives 220A are elongated elements having their axes perpendicular to the axes of rotation of the rolls 180A and 200A and thus parallel to the longitudinal axis of the film. The knives 220B are elongated elements having their axes parallel to the axes of rotation of the rolls 180B and 200B and thus perpendicular to the longitudinal axis of the film.

The films 110A and 110B are shown being laminated between substrates 320A and 320B to form a laminate 360.

It is within the invention to omit the substrates and simply laminate the two films together or to make any number of combinations involving at least one polymeric film and one other layer or laminate.

Depending on the density of or closeness required between the tapes, the slit film (or other net-like film) may be spread apart (or brought together) prior to being fed into a laminator, by using such conventional devices as bowed rolls, etc.

Figure 8:
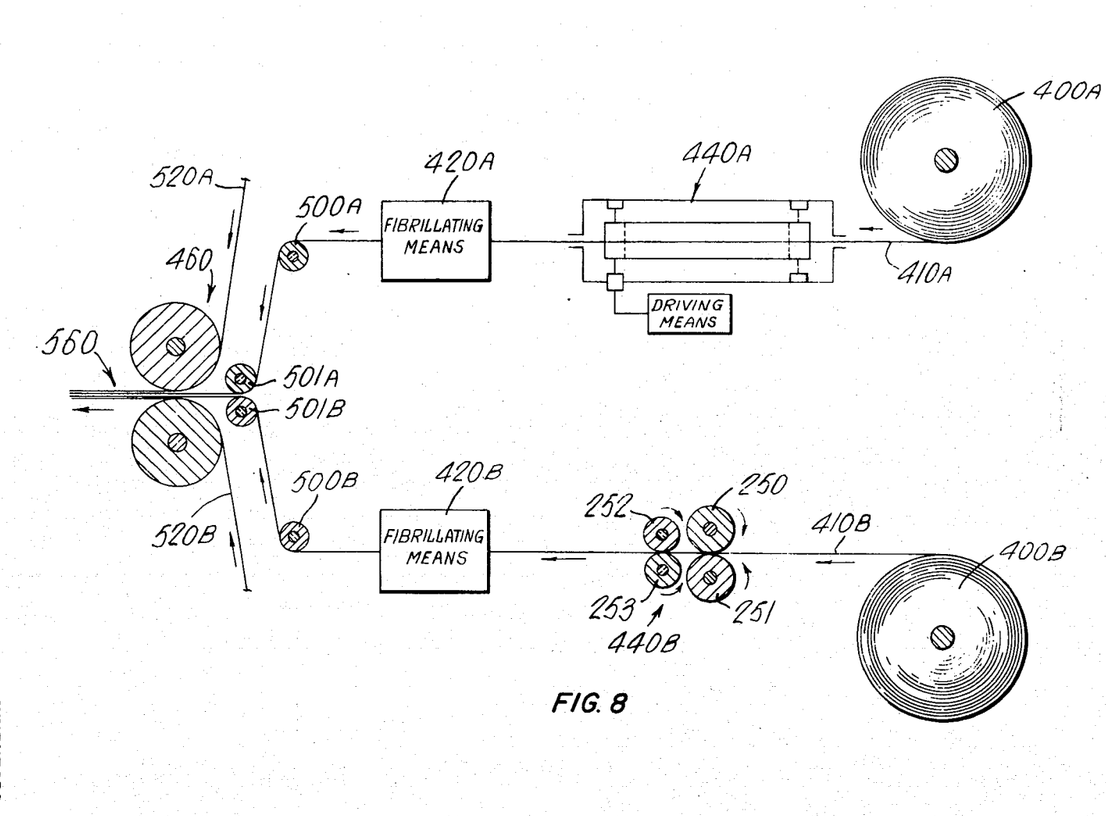
FIG. 8 is a side elevation schematically illustrating the method for making another laminate according to the invention.

With reference to FIG. 8 continuous lengths of film 410A and 410B are fed from supply rolls 400A and 400B, the films 410A and 410B pass between tentering apparatus 440A and longitudinal stretching apparatus 440B and between fibrillating means 420A, 420B from which they pass between pairs of rollers 500A, 501A and 500B and 501B to a laminator 460.

The tentering apparatus 440A stretches the film 410A in the lateral direction of the film 401B and the longitudinal stretching apparatus 440B, which comprises rollers 250, 251, and 252, 253, the two pairs of rollers rotate at different speeds thereby stretching the film 410B in the longitudinal direction of the film 410B, more particularly rollers 252, 253 rotate at a higher speed than rollers 250, 251.

The fibrillating means may be any fibrillating means, for example, grating, turning, twisting, brushing, or by means of reeling, combing and carding machines as used in the hemp, flax or jute industries, or by heating the oriented film with wedge or knife shape hammers, upon an elastic bottom, or by forcing them in the direction of orientation through fluted rollers, or by means of perforating rolls, pins, ultrasonic fibrillating means, the impact force of solid particles or a fluid.

The films 410A, 410B are shown being laminated between substrates 520A and 520B to form a laminate 560. Prior to lamination the films are preferably spread (not shown) to form a reinforcing network.

Figure 9:
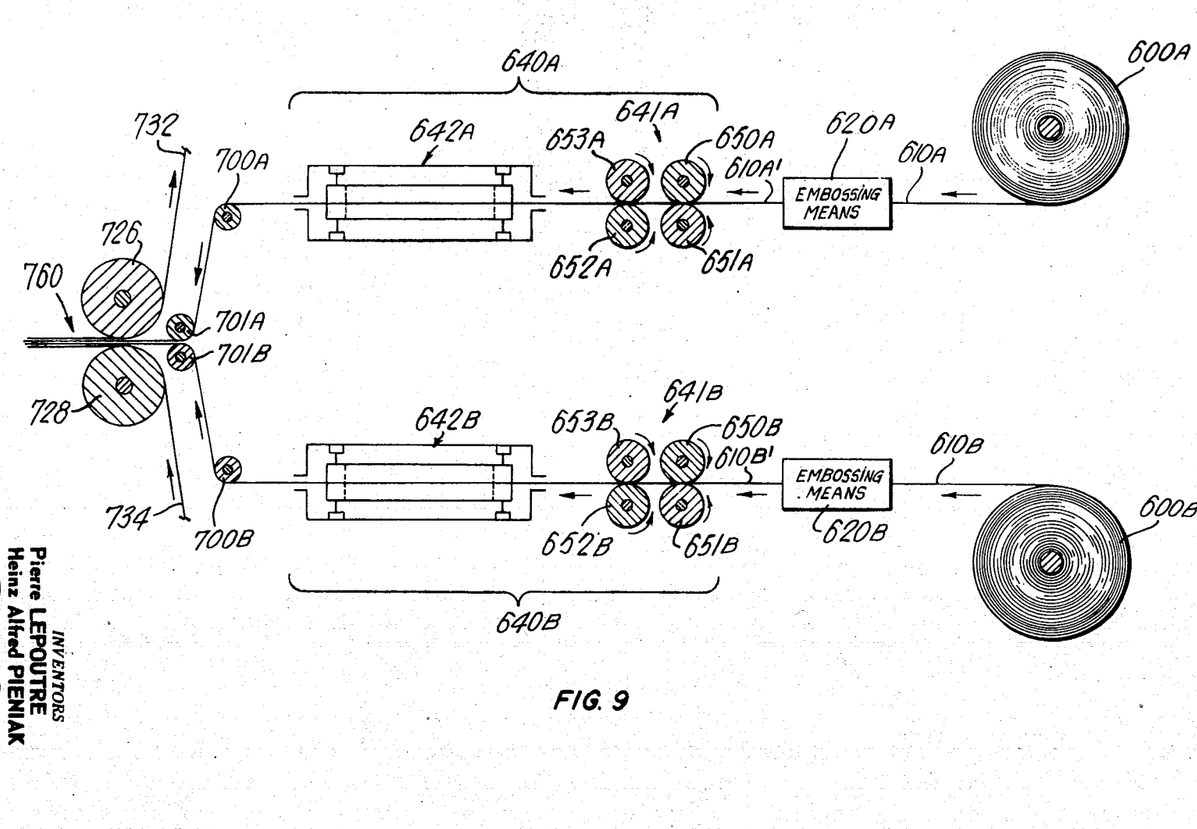
FIG. 9 is a side elevation schematically illustrating the method for making another laminate according to the invention.

With reference to FIG. 9 continuous lengths of film 610A, 610B, are fed from supply rolls 600A and 600B, the films 610A, 610B pass into embossing means 620A, 620B, the shape in plan of the embossments is polygonal, regular or irregular, for example triangular, square, pentagonal, hexagonal, heptagonal, octagonal, etc. The embossed films 610A', 610B' pass between stretching apparatus 640A, 640B from which they pass between pairs of rollers 700A, 701A and 700B, 701B to a laminator 760.

The stretching apparatus 640A, 640B comprises longitudinal stretching means 641A, 641B and lateral stretching means 642A, 642B; the longitudinal stretching means comprises pairs of rollers 650A, 651A, 652A, 653A and 650B, 651B, 652B, 653B, the pairs of rollers of each stretching means rotating at different speeds, for example in the stretching means 641A the rollers 652A, 653A will rotate at a greater speed than the rollers 650A, 651A.

The laminator 760 comprises a pair of driven rolls 726 and 728 forming a nip, which laminates webs 732 and 734 and the net films together.

The embossing means may be any embossing means, for example in the case of extruded films, the embossing may be effected by including an embossing roller in the chill-roll take off unit, so that an embossing roller in the chill-roll take off unit, so that the hot extrudate is trapped between the embossing roller and the chill-roll a few inches from the lips of the extruder die. Alternatively, a film may be embossed by heating it to soften it, and passing it between an embossing roller and a chilled roller.

The films may be embossed on one side only or on both sides, and the embossments may be in a variety of patterns, one such pattern comprises embossments of hexagonal shape arranged with spaces between adjacent hexagons, the hexagons being arranged in parallel rows in the longitudinal direction of the film and with two parallel flat edges of each of the hexagons in the lateral direction of the film, the parallel longitudinal rows of hexagons being arranged so that the centers of every four adjacent hexagons are at the angular corners of a rhombus with obtuse angles aligned longitudinally of the films and acute angles laterally of the film. The subsequent longitudinal and lateral stretching splits the films with a multiplicity of short splits, the splits extending in the longitudinal direction between the aligned bosses of each longitudinal row. In this way, the splits of the longitudinal rows pass through the spaces between the laterally adjacent hexagons of two adjacent rows. This results in films in which each hexagonal boss of a row has four thinned narrow bands of the partly elongated material integral therewith and extending from the flat edges, which are not transverse to the film, two of the bands being connected to the two adjacent hexagonal bosses in the adjacent longitudinal row above, and two bands to the two adjacent hexagonal bosses in the adjacent longitudinal row beneath.

This produces a net-like structure in the film, the bosses being located at the intersections of the net.

The net-like structure may also be formed by other means, for example by punching or stamping out material from a film to form a pattern of holes in the film, and stretching the film to elongate the spaces between the holes. The net-like structure may also be formed by extrusion or weaving, the net being oriented by a subsequent stretching operation.

The method of lamination has been described with reference to the laminations of two pre-slit oriented films, which films may comprise spaced apart ribbons interconnected by nodes to define apertures, films in which the apertures are of substantially zero width and films having substantially zero nodes between the slits such that the film comprises a plurality of tapes. The method is also applicable to post fibrillated films as described above, in which the fibrillating means is interposed between the stretching device and the laminator. The method may be used to laminate any combination of pre-slit oriented films or post fibrillated films or combinations of pre-slit oriented films and post fibrillated films.

The method of lamination is also applicable to the lamination of continuous films and net-like structures.

In the lamination of continuous films, a laminate having strength in two directions at 90° to each other may be formed using apparatus similar to that in FIG. 7 of the accompanying drawings, without the use of the slitting means. In this case, a first film is stretched and thereby oriented in its lateral direction, and a second film is stretched in its longitudinal direction, the films being fed together into a laminator. Of course, the principle is not necessarily limited to two films and any number of oriented films may be fed together into a laminator, the orienting units being disposed vertically one above the other or in a staggered arrangement in a vertical plane.

A laminate of nets may be formed as described above. In one embodiment, the net-like structure is formed by embossing at least one surface of a thermoplastic film with small solid bosses or raised figures arranged with spaces between adjacent bosses in longitudinal and lateral rows; the film is stretched in the longitudinal and lateral directions, thus splitting the film. The longitudinal and lateral stretching may take place as successive steps or the film may be stretched in the longitudinal and lateral directions simultaneously. In either case, the result is an open net-like structure. A plurality of the nets can then be fed into a laminator, either above or between substrates.

As an example of one of the many laminates which can be formed using this method, a non-woven laminate having the appearance of a woven fabric may be formed from three sets of tapes fed into a laminator. Two sets of tapes are oriented with the tapes at right angles to each other, one set lying above the other set. A third set overlies the second set, the tapes of the third set being parallel to and offset relative to the first set. In this case, the second set of tapes may be of the form disclosed above with reference to FIG. 6, the first and third sets being parallel arrays of tapes formed by slitting films longitudinally substantially their full length and stretching to produce a plurality of longitudinally extending tapes. The tapes of the third set can be offset so as to lie between the tapes of the first set by suitable guide means.

A film having a curled effect can be produced by slitting and stretching the film, relaxing the stretching tension thereby producing the curled effect, and heat setting the film to retain the curled effect. This curled film may then be laminated between creped material using the apparatus described with reference to FIGS. 1 and 2. This produces a product having a high inherent stretchability.

The disclosure has described mainly lateral stretching of the web. However, longitudinal stretching may be used in particular in relation to an apertured film having nodes therein as described in the first embodiment. Care must be taken during the stretching operation to ensure that the required degree of elongation is obtained without breakage of the film.

In the case of very wide laminates, it may be less expensive to employ a number of longitudinal tenters substantially side by side in place of one wide tenter. Alternatively, a single longitudinal tenter, independent of the lateral tenter, could make the required film, which would be wound into separate rolls and the film from these separate rolls could be unwound and fed into the laminator at the same time that the lateral film was being made (as described above).

It is also possible and within the present invention to apply the stretching force in a direction at right angles to the direction of the slit, and to apply a stretching force in both the direction of the slit and in a direction at right angles to the direction of the slit, thereby forming a bi-oriented film.

It is also possible to combine the steps of making film, e.g. by die or blow extrusion, etc., with those of preslitting, stretching and laminating. Such a combination could, for example, facilitate the pre-slitting step by allowing the temperature of the film to remain above the ambient temperature following its extrusion.

I claim:

1. In a method for making a cross laminate consisting of at least two uniaxial oriented layers in which the direction of orientation of each layer is disposed at an angle to one another, the improvement which comprises continuously supplying a continuous orientable stretchable thermoplastic first film to a first slitting means, continuously slitting said first film with a plurality of substantially parallel spaced apart slits in a pattern to form a plurality of interconnected substantially parallel first film ribbons with the long axis of said ribbons substantially parallel to the longitudinal direction of said film to produce a first slit film, continuously feeding said first slit film to a longitudinal stretching means, continuously stretching said first slit film and said ribbons in said longitudinal direction to elongate, orient, and neck down said ribbons thereby reducing the width of said ribbons and forming openings therebetween and to produce a first relaxable oriented film, relaxing said first relaxable film to produce a first curled film, heat setting said first curled film to produce a first uniaxially oriented layer having a high inherent stretchability, continuously feeding said first oriented layer under longitudinal tension into a laminator, continuously supplying a continuous orientable stretchable thermoplastic second film to a second slitting means, continuously slitting said second film with a plurality of substantially parallel spaced apart slits in a pattern to form a plurality of interconnected substantially parallel second film ribbons with the long axis of said second film ribbons substantially parallel to the lateral direction of said film to form a second slit film, continuously feeding said second slit film to a lateral stretching means, continuously stretching said second slit film and said second film ribbons in said lateral direction to elongate, orient, and neck down said ribbons thereby reducing the width of said ribbons and forming openings therebetween and to produce a second relaxable oriented film, relaxing said second relaxable film to produce a second curled film, heat setting said second curled film to produce a second uniaxially oriented layer having a high inherent stretchability continuously feeding said second oriented layer under lateral tension into said laminator, each of said first and second films and layers is disposed in substantially horizontal and parallel planes one above the other and each is supplied and stretched simultaneously and is fed simultaneously under tension into said laminator, continuously laminating said first and second layers to produce said cross laminate.

2. In a method for making a cross laminate consisting of at least two uniaxial oriented layers in which the direction of orientation of each layer is disposed at an angle to one another, the improvement which comprises continuously supplying a continuous orientable stretchable thermoplastic first film to a first slitting means, continuously slitting said first film with a plurality of substantially parallel spaced apart slits in a pattern to form a plurality of interconnected substantially parallel first film ribbons with the long axis of said ribbons substantially parallel to the longitudinal direction of said film to produce a first slit film, continuously feeding said first slit film to a first pleating means, pleating said first slit film to produce a first pleated film having pleats running in the longitudinal direction, the extent of the pleating being such so as to determine the width to which said slits shall open during the stretching step by allowing said film as a whole to neck down, continuously feeding said first pleated film to a longitudinal stretching means, continuously stretching said first pleated film and said ribbons in said longitudinal direction to elongate, orient, and neck down said ribbons thereby reducing the width of said ribbons and forming openings therebetween as determined by said pleating and to produce a first uniaxially oriented layer, continuously feeding said first oriented layer under longitudinal tension into a laminator, continuously supplying a continuous orientable stretchable thermoplastic second film to a second slitting means, continuously slitting said second film with a plurality of substantially parallel spaced apart slits in a pattern to form a plurality of interconnected substantially parallel second film ribbons with the long axis of said second film ribbons substantially parallel to the lateral direction of said film ribbons with the long axis of said second film ribbons substantially parallel to the lateral direction of said film to form a second slit film, continuously feeding said second slit film to produce a second pleated film having pleats running in the lateral direction, the extent of the pleating being such so as to determine the width to which said slits shall open during the stretching step by allowing said film as a whole to neck down, continuously feeding said second pleated film to a lateral stretching means, continuously stretching said second pleated film and said ribbons in said lateral direction to elongate, orient, and neck down said ribbons thereby reducing the width of said ribbons and forming openings therebetween as determined by said pleating and to produce a second uniaxially oriented layer, continuously feeding said second oriented layer under lateral tension into said laminator, each of said first and second films and layers is disposed in substantially horizontal and parallel planes are above the other and each is supplied and stretched simultaneously and is fed simultaneously under tension into said laminator, continuously laminating said first and second layers to produce said cross laminate.

* * * * *